United States Patent [19]

White, Jr. et al.

[11] Patent Number: 5,619,288
[45] Date of Patent: Apr. 8, 1997

[54] IMPACT RESISTANT PLASTIC OPHTHALMIC LENS

[75] Inventors: Sidney S. White, Jr., Seminole; Julie S. Berzon, St. Petersburg; Hoa T. Dang, Tampa; Sheila M. Tatman, Seminole; Robert A. Valeri, Tampa; Kelly Benjamin, Pinellas Park, all of Fla.

[73] Assignee: Essilor of America, Inc., St. Petersburg, Fla.

[21] Appl. No.: 376,827

[22] Filed: Jan. 23, 1995

[51] Int. Cl.$^6$ .................................................. G02C 7/02
[52] U.S. Cl. .................................... 351/159; 351/166
[58] Field of Search ............................... 351/159, 166

[56] References Cited

U.S. PATENT DOCUMENTS

| | | | |
|---|---|---|---|
| 3,935,367 | 1/1976 | Merrill et al. | 351/166 |
| 4,262,072 | 4/1981 | Wendling et al. | 351/166 |
| 4,319,811 | 3/1982 | Tu et al. | 351/166 |
| 4,348,426 | 9/1982 | Blenner et al. | 427/41 |
| 4,417,790 | 11/1983 | Dawson et al. | 351/166 |
| 4,427,823 | 1/1984 | Inagaki et al. | 524/833 |
| 4,438,462 | 3/1984 | Koester et al. | 360/2 |
| 4,486,504 | 12/1984 | Chung | 428/412 |
| 4,544,572 | 10/1985 | Sandvig et al. | 427/44 |
| 4,550,059 | 10/1985 | Dalton et al. | 428/409 |
| 4,586,996 | 5/1986 | Shinohara et al. | 351/166 |
| 4,632,527 | 12/1986 | Masso et al. | 351/166 |
| 4,758,448 | 7/1988 | Sandvig et al. | 427/164 |
| 4,774,035 | 9/1988 | Carmelite et al. | 264/1.4 |
| 4,954,591 | 9/1990 | Belmares | 526/264 |
| 5,015,523 | 5/1991 | Kawashima et al. | 428/336 |
| 5,126,394 | 6/1992 | Revis et al. | 524/548 |

FOREIGN PATENT DOCUMENTS

63-309901  6/1987  Japan.

*Primary Examiner*—Scott J. Sugarman
*Attorney, Agent, or Firm*—Quarles & Brady

[57] ABSTRACT

A method is disclosed for imparting impact resistance to a plastic ophthalmic lens. The method consists of applying a coating of a multifunctional acrylate in a solvent mixture to the back surface of the lens, and curing the multifunctional acrylate to form an impact resistance imparting coat. The multifunctional acrylate preferably has at least about 40%, by weight, of a difunctional acrylate. The multifunctional acrylate preferably has a glass transition temperature less than about 60° C. Lenses with an impact resistance imparting coat on the back, and an abrasion resistant coat on at least the front of the lens, are also disclosed.

13 Claims, 2 Drawing Sheets

IMPACT RESISTANT PLASTIC OPHTHALMIC LENS

FIELD OF THE INVENTION

The present invention relates to ophthalmic lenses. More particularly, it relates to a method of imparting impact resistance to plastic lenses, compositions for use in the method and the lenses prepared by practice of the method.

BACKGROUND OF THE INVENTION

Ophthalmic lenses of plastic have become very popular because they are inexpensive, lighter in weight and more resistant to shattering than glass. However, the plastic lenses generally have less surface hardness and wear resistance. Therefore, they are usually coated with abrasion resistant coatings.

The surfaces of lenses made of diethylene glycol bis(allylcarbonate) ("CR-39", a registered trademark of PPG Industries of Pittsburgh, Pa.) or high index polyurethane-(HIPU) can be made to be hard and abrasion resistant by the use of abrasion resistant coatings; however, their impact resistance can be greatly reduced by these hard, abrasion resistant coatings, especially in combination with a brittle vacuum deposited antireflective coating. Thin lenses, with a center thickness of about 1.0 mm, are highly desired for cosmetic and weight considerations. However, the thickness of a lens is related to the impact properties of the lens. Specifically, thinner lenses have a lower impact resistance. Plastic lenses that are sold in the United States must meet the requirements of the Food and Drug Administration (FDA), which has specific requirements for the impact properties of a lens.

It would be advantageous to have plastic lenses which are more impact resistant and a method of imparting an impact resisting property that meets or exceeds the FDA requirements for plastic lenses.

SUMMARY OF THE INVENTION

It is an object of the present invention to disclose a novel method of imparting impact resistance to a plastic ophthalmic lens.

It is a further object to disclose novel compositions for use in the method of the present invention.

It is a still further object to disclose a novel lens prepared by the practice of the method of the present invention.

The novel method of the present invention comprises coating the back of a plastic lens with a novel impact resistance imparting composition of a multifunctional acrylate, such as tetraethylene glycol diacrylate and/or diethylene glycol diacrylate, dissolved preferably in a solvent mixture of an organic ketone, such as methyl isobutyl ketone, and an alcohol, such as 1-butanol, and then curing the composition to obtain a plastic ophthalmic lens with an impact resistance imparting coat on its back.

The multifunctional acrylate preferably comprises at least about 40%, by weight of the acrylate, of a difunctional acrylate. According to another embodiment of the invention, the glass transition temperature of the multifunctional acrylate is preferably less than about 60° C. This will prevent the coating from becoming too hard, and losing the impact resistance imparting properties.

In one embodiment of the invention the novel impact resistance imparting composition contains a UV photoinitiator and the coating is cured with UV light.

In another embodiment of the invention the composition also contains colloidal silica or colloidal antimony oxide.

According to another aspect of the present invention, impact resistant coatings are applied to the back surface of lenses (usually concave), but preferably not to the front surfaces (usually convex), by a spin-coating process. The lenses are then coated with an abrasion-resistant hard coat by a dip-coating process.

It will be apparent to those skilled in the art from the description which follows that the above objects and further advantages can be obtained by the practice of the present invention.

DESCRIPTION OF THE PREFERRED EMBODIMENT

Figure 1:
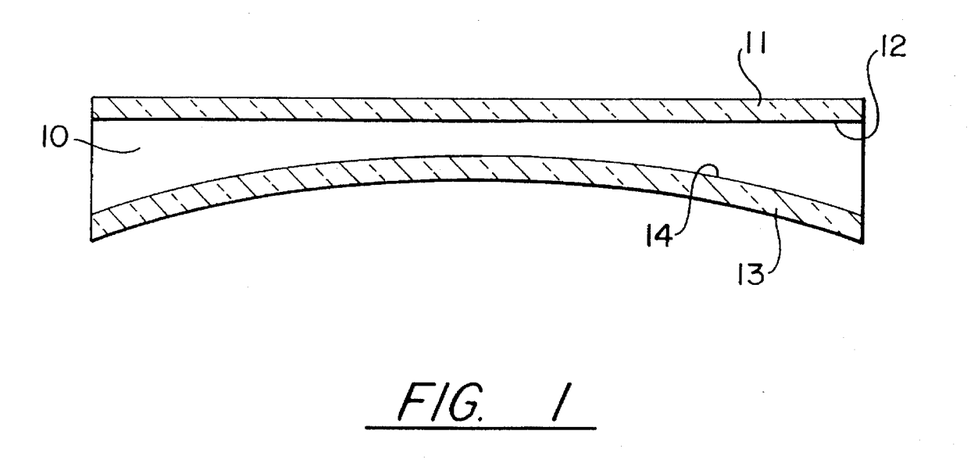
FIG. 1 is a sectional view of a portion of a plastic ophthalmic lens with an abrasion resistant coat on the front of said lens and an impact resistance imparting coat on the concave back of the lens.

In the preferred embodiment of the invention, a plastic lens 10, seen in FIG. 1, is provided with an abrasion resistant hard coat 11 on its top or front 12 and an impact resistance imparting coat 13 on its back 14. The front of the lens is considered to be the surface that is farthest from the eye of the wearer, and the back of the lens is considered to be the surface that is nearest the wearer.

The abrasion resistant hard coat 11 can be applied by any of a variety of conventional techniques.

The impact resistance imparting coat 13 is preferably applied to the back 14 of the lens 10 by applying a coating of an impact resistance imparting composition comprising a multifunctional acrylate in a volatile solvent or reactive diluent.

Figure 2:
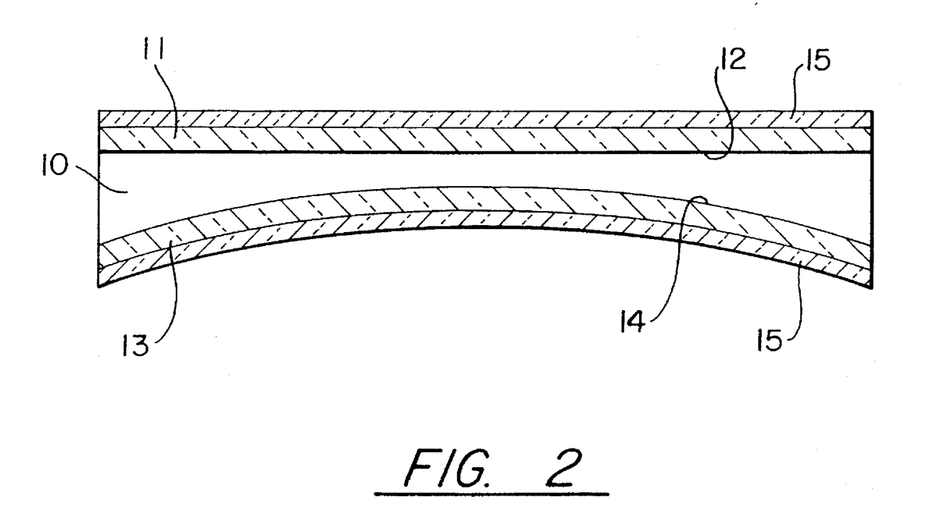
FIG. 2 is a sectional view like FIG. 1 in which the lens also has antireflection coats on its front and back.

The coating of the impact resistance imparting composition is then cured to provide the coat 13. Antireflective coatings 15, seen in FIG. 2, can then be applied to the front 12 over the hard coat 11 and to the back 14 over the impact resistance imparting coat 13.

Figure 3:
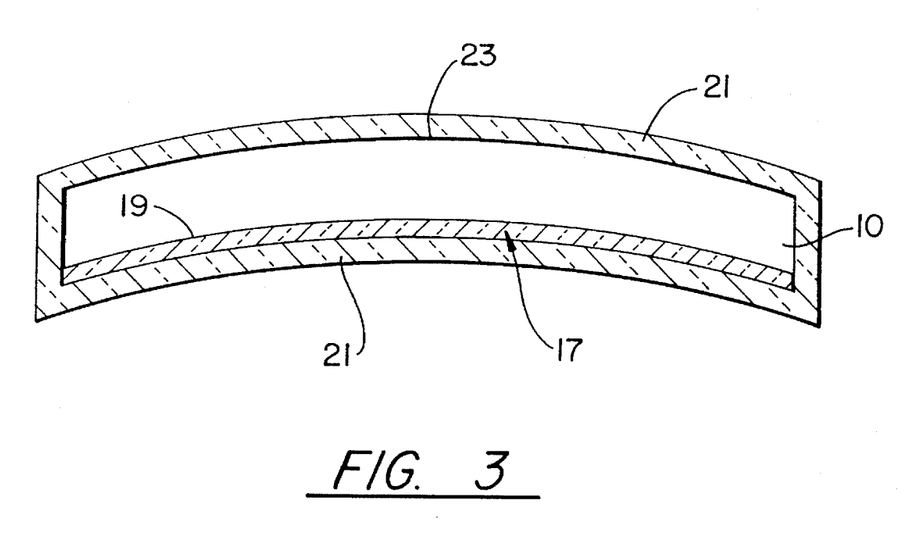
FIG. 3 is a sectional view like FIG. 1 in which the lens has an impact resistance imparting coat on the concave back of the lens, and an abrasion resistant hard coat over the front and the back of the lens.

A further embodiment illustrated in FIG. 3 has an impact resistance imparting coat 17 on the back surface 19 of the lens 10. The impact resistance imparting coat 17 is preferably applied by a spin-coating process. An abrasion resistant hard coat 21 is provided over the front surface 23 and back surface 19 of the lens 10, and is preferably formed by a dip-coating process.

A hard coat comprising an organosilicone resin is preferred. A typical organosilicone resin that is suitable for the invention has a composition comprising one or more of the following:

(1) organosilane compounds with functional and/or non-functional groups such as glycidoxypropyl trimethoxy silane;

(2) coreactants for functional groups of functional organosilanes, such as organic epoxies, amines, organic acids, organic anhydrides, imines, amides, ketamines, acrylics, and isocyanates;

(3) colloidal silica, sols and/or metal and non-metal oxide sols preferably having an average particle diameter of from about 1 to about 100 nanometers, and most preferably between about 5 and about 40 microns;

(4) catalysts for silanol condensation, such as dibutylin dilaurate, zinc napthenate, aluminum acetylacetonate, zinc napthenate, zirconium octoate, lead 2-ethylhexoate, aluminum alkoxides and aluminum alkoxide organosilicone derivatives, and titanium acetylacetonate;

(5) catalysts for coreactants such as epoxy catalysts and free radical catalysts;

(6) solvents such as water, alcohols, and ketones;

(7) surfactants, such as fluorinated surfactants including 3M FC430 and 3M FC431 (3M Company, St. Paul, Minn.), DuPont FSN and DuPont FS (E.I. DuPont de Nemours & Co., Wilmington, Del.) or polydimethyl siloxane surfactants, such as BYK 300 or BYK 371 (BYK Chemie U.S.A., Wallingford, Conn.);

(8) other additives, such as fillers;

In the present invention, any type of organosilicone hard coat can be used, but a hard coat of the type which contains the silanol condensation product of a colloidal silica and organosilane containing functional groups cured with an appropriate catalyst is preferable.

Hard coats of acrylic, urethane, melamine, and the like may also be used. These materials, however, frequently do not have the good abrasion resistant properties of organosilicone hard coatings.

Hard coats may be coated by conventional methods such as dip coating, spray coating, spin coating, flow coating and the like. Withdrawal rates, viscosity, and percent solids are common methods of controlling dip coating thickness and uniformity. Coating thicknesses between 0.5 and 10 microns are preferred for abrasion and other properties.

A single-layer anti-reflective coating can be provided, if desired. Multi-layer anti-reflective coatings are preferred from an optical performance viewpoint. Examples of materials useful in forming anti-reflective coatings include oxides, fluorides, silicides, borides, carbides, nitrides and sulfides of metal and non-metals and metals.

More specifically, metal oxides which are useful for forming anti-reflective coatings include $SiO$, $SiO_2$, $ZrO_2$, $Al_2O_3$, $TiO$, $TiO_2$, $Ti_2O_3$, $Y_2O_3$, $Yb_2O_3$, $MgO$, $Ta_2O_5$, $CeO_2$ and $HfO_2$. Fluorides which can be used include $MgF_2$, $AlF_3$, $BaF_2$ $CaF_2$, $Na_3AlF_6$, $Ta_2O_5$, and $Na_5Al_3Fl_{14}$. Metals which can be used include Cr, W and Ta. These substances may also be used in the form of mixtures.

The above mentioned substances are formed into single layer or multi-layer anti-reflective coatings by vacuum evaporation, deposition, sputtering, ion plating, and ion beam assisted methods.

The present invention is further illustrated by the Testing and Examples.

TESTING

A number of tests were performed to measure the abrasion resistance, scratch resistance, adhesion and impact resistance of coated and uncoated plastic lenses.

Bayer Abrasion Resistance Test

The abrasion resistance of a coating was examined by subjecting the coated lens to a fixed cycle of oscillating sand abrasion, similar to ASTM #F735-81, using approximately 500 grams of quartz silica and sand size 6/14 supplied by Crystal Silica Company, Riverside, Calif. or another suitable supplier such as Silica Sand 6/14 from CGM, P.O. Box 413, Salem, Pa. 19020. The haze before and after abrasion was measured using a Pacific Scientific Hazemeter XL-211.

The change in the haze measurement before and after abrasion of the uncoated and coated lenses was tested. The ratio of the uncoated lens haze measurement to the coated lens haze measurement determines the performance of the test lens. The higher the ratio, the better the performance of the coating. Results of at least 3 test lenses are averaged for a final ratio.

Steel Wool Scratch Resistance Test

The "cutting" scratch resistance of the coatings was examined by subjecting the coated lens to abrasion similar to that described in U.S. Pat. No. 4,084,021. The device described in the patent was modified to rock the sample in an arch equivalent to a 600 diopter radius, which matches the front curve of the test specimens. "000" steel wool was used with the grain parallel to the rocking motion. The amount of abrasion was quantified by measuring the transmitted light haze of the abraded specimen, before and after abrasion, as described in the Bayer Abrasion Resistance Test. The results of this test are rated as Excellent, Good or Poor.

Adhesion Test

A steel straight edge and knife with #11 blade (or Gardco cross cut tester) was used to make eleven ½" long cuts on a front surface of the coated lens. Eleven more ½" cuts spaced at right angles to, and across the first set of eleven cuts, were then made. One-inch wide semi-transparent pressure sensitive tape (adhesion strength of 36 +2.6 oz./in, Ref. ASTM D-3359 American Society of Testing and Materials, 1916 Race Street, Philadelphia, Pa. 19103-1187) was then applied to the cut areas of the coated lens. The tape was pulled vertically at a 90 degree angle from the coated lens surface with a quick motion. This step was performed in triplicate using a new section of tape for each test. The lens was then examined for any coating chips that may have been pulled off with the tape. This entire process is repeated after tinting in BPI black dye, available from Brainpower, Inc. of Miami, Fla. at 92° C.±2° C. for three minutes. The results of this test are rated as Excellent, Good and Poor.

Impact Resistance

The impact resistance of the lenses was measured directly using a Dynatup Instrument Impact tester available from General Research Corp., Santa Barbara, Calif. This tester was modified to have a lens support tube and a ⅝" diameter steel ball as the impactor, as specified in CFR 801.410 (FDA). A load cell, velocity indicator and micro-computer were used to integrate the total energy applied to the lens at the point of fracture. All samples were impacted with the equivalent velocity of a 50" free fall. The results of this test are measured in in/lb. In general, impact results between about 3.01 and 10 in/lb can be regarded as good, and impact results about above 10.01 can be regarded as excellent.

Lens Preparation & Coating Process

The concave side of the semifinished lenses of diethylene glycol bis(allylcarbonate) (CR-39) and high index polyurethane (HIPU) were surfaced, a method of cutting and removing the substrate to a preferred thickness, and polished to 1.0 mm nominal center thickness. These lenses had a factory hard coat on the convex side. The lenses were washed with a soft sponge and a mild liquid detergent. Lenses were wiped to dryness by using Kay Dry paper towels manufactured by Kimberly-Clark. A small amount of isopropanol was used to prepare the lens surface prior to loading the lenses into a spin coating machine. An impact resistance imparting coating was applied to the lenses by a spin coating process.

The spin coating process of the invention can utilize suitable devices such as the Clean n Coat model sold by Coburn Optical Industries, of Muskogee, Okla., or the Photo Resist model #1-PM101D-R465 from Headway Research, Inc. of Dallas, Tex. A coating liquid was applied automatically in the Clean n Coat model, or manually with a plastic pipette in the Photo Resist model, at low spin speeds. The coating spin speeds are preferably between about 150 rpm and 800 rpm, and most preferably between about 500 rpm and 600 rpm. The spinning time during the coating process is preferably between about 5 seconds and about 20 seconds, and most preferably between about 10 seconds and about 15 seconds. The lenses are then spun to remove excess coating and to dry the lenses. Spin-off and drying is preferably performed at spin speeds of between about 700 rpm and about 3500 rpm, and most preferably between about 800 rpm and about 1000 rpm. The spinning time is preferably between about 15 seconds and about 60 seconds, and most preferably between about 20 seconds and about 40 seconds.

The thickness of the impact resistance imparting coat can vary, but is preferably between about 0.1 and about 10 microns. The thickness is most preferably between about 0.5 and about 5 microns for impact, abrasion, and other properties.

The coated lenses were transferred and cured in a suitable UV curing machine (Quick Cure III U.V. curing unit, manufactured by Coburn Optical Industries). Finally, an antireflective coating was applied by vacuum deposition to both surfaces of the lens. The vacuum deposition was done by Essilor of America, Inc., Reflection Free Division, of St. Petersburg, Fla.

EXAMPLE 1

Tetraethyleneglycol diacrylate 29.4 parts was added to a premixed solvent that consisted of 51.5 parts of methyl isobutyl ketone and 17.2 parts of 1-butanol. The mixture was stirred and mixed for ten minutes. 1.8 parts of photoinitiator Irgacure-500, 50:50 mixed of 1-hydroxycyclohexyl phenyl ketone and benzophenone from Ciba Giegy, and 0.1 part of surfactant was added to the mixture. The final coating formulation was allowed to mix for an additional 10 minutes. The coating was filtered prior to the coating application.

The lens was prepared and coated as previously described. This coating provided good adhesion to the lens substrate. A coating of 1.7 microns was coated and cured on the concave side of the lenses of CR-39 and HIPU. Finally, an antireflective coating was applied by vacuum deposition to both surfaces of the lens as described above. The final lenses were subjected to the physical performance characterization. See Table I and Table II for performance testing results.

| COMPOSITION | PARTS |
|---|---|
| Tetraethyleneglycol Diacrylate | 29.4 |
| Methyl Isobutyl Ketone | 51.5 |
| 1-Butanol | 17.2 |
| Irgacure-500 (Photoinitiator) | 1.8 |
| Surfactant | 0.1 |

EXAMPLE 2

Tetraethyleneglycol diacrylate 30 parts were added to a solvent mixture that consisted of 45.3 parts of methyl isobutyl ketone and 15.2 parts of 1-butanol. The mixture was stirred for 10 minutes. 1.8 parts of Irgacure-500 and 7.6 parts of colloidal silica in methanol (MA-ST from Nissan Chemical Industries) were added to the mixture. Finally, 0.1 part of surfactant was added and stirred for an additional 10 minutes. The lens was prepared, coated with a 1.7 micron coating of the impact resistance imparting composition on the concave side of the lens, and cured in the same manner as described in the Example 1. An anti-reflective coating was applied to both surfaces of the lenses as in Example 1. The final coated lenses were prepared for performance testing as described above. See Table I and Table II for performance testing results.

| COMPOSITION | PARTS |
|---|---|
| Tetraethyleneglycol Diacrylate | 30.0 |
| Methyl Isobutyl Ketone | 45.3 |
| 1-Butanol | 15.2 |
| Irgacure-500 | 1.8 |
| Colloidal Silica in methanol | 7.6 |
| Surfactant | 0.1 |

TABLE I

| Substrate | Back Coating | Steel Wool | Anti-reflective Coat | Thickness of Lens Center | Impact Mean Break Point |
|---|---|---|---|---|---|
| CR-39 | no | good | no | 1.10 mm | 2.78 in/lb |
| CR-39 | Ex. 1 | excellent | no | 0.88 mm | 17.99 in/lb |
| CR-39 | Ex. 2 | excellent | no | 0.87 mm | 13.08 in/lb |
| CR-39 | no | good | yes | 1.10 mm | 4.52 in/lb |
| CR-39 | Ex. 1 | excellent | yes | 0.88 mm | 6.46 in/lb |
| CR-39 | Ex. 2 | excellent | yes | 0.88 mm | 15.38 in/lb |

Note: Adhesion was excellent for all examples

TABLE II

| Substrate | Back Coating | Steel Wool | Anti-reflective Coat | Thickness of Lens Center | Impact Mean Break Point |
|---|---|---|---|---|---|
| HIPU | no | poor | no | 1.00 mm | 21.06 in/lb |
| HIPU | Ex. 1 | good | no | 0.95 mm | 28.93 in/lb |
| HIPU | Ex. 2 | excellent | no | 0.96 mm | 30.73 in/lb |
| HIPU | no | poor | yes | 1.10 mm | 32.51 in/lb |
| HIPU | Ex. 1 | good | yes | 0.95 mm | 27.78 in/lb |
| HIPU | Ex. 2 | excellent | yes | 0.99 mm | 27.05 in/lb |

Note: Adhesion was excellent for all examples

Tables I and II demonstrate that the invention provides dramatic improvement in impact resistance for lenses without an antireflective coating. In Tables I and II, the presence of an antireflective (RF) coating is indicated. With the HIPU lens substrate, abrasion resistance is dramatically improved on these lenses with no loss in impact resistance. With CR-39 lens substrates, there is an improved impact and abrasion resistance for lenses with an antireflective coating.

The impact resistance results demonstrated that the back coatings of the present invention improved and preserved the impact resistance for CR-39 substrate. Meanwhile, it improved or maintained the impact resistance of the HIPU substrate.

EXAMPLE 3

Diethylene glycol diacrylate 38.9 parts was added to a solvent mixture that consisted of 40.9 parts of methyl ethyl ketone and 17.5 parts of 1-butanol. The mixture was stirred for approximately 10 minutes. Then 2.3 parts of Irgacure-500 and 0.4 part of surfactant was added and stirred for an additional 10 minutes. HIPU lenses were prepared, coated with a 2.0 micron coating, and the coating was cured in the manner described in Example 1. See Table III for performance testing results.

| COMPOSITION | PARTS |
| --- | --- |
| Diethylene Glycol Diacrylate | 38.9 |
| Methyl Ethyl Ketone | 40.9 |
| 1-Butanol | 17.5 |
| Irgacure-500 | 2.3 |
| Surfactant | 0.4 |

EXAMPLE 4

Diethylene glycol diacrylate 26.2 parts was added to a solvent mixture that consisted of 33.7 parts of methyl ethyl ketone, 18.7 parts of 1-butanol and 11.2 parts of ethanol. The mixture was stirred for approximately 10 minutes. 2.3 parts of Irgacure-500 and 7.5 parts of colloidal antimony oxide was added to the mixture and mixed well. Finally, 0.4 parts of surfactant was added and stirred for 10 minutes. The lenses were prepared, coated with a 1.5 micron coating, and cured in the manner described in Example 1. See Table III for performance testing results.

| COMPOSITION | PARTS |
| --- | --- |
| Diethylene Glycol Diacrylate | 26.2 |
| Colloidal Antimony Oxide | 7.5 |
| Methyl Ethyl Ketone | 33.7 |
| 1-Butanol | 18.7 |
| Ethanol | 11.2 |
| Irgacure-500 | 2.3 |
| Surfactant | 0.4 |

EXAMPLE 5

Diethylene glycol diacrylate 40 parts was added to a solvent mixture that consisted of 14.4 parts of methyl ethyl ketone, 20.7 parts of 1-pentanol and 14.4 parts of ethanol. The mixture was mixed for approximately 10 minutes. 1.6 parts of Irgacure-500 and 0.4 part of isopropylthioxanthole was added and mixed well. Finally, 0.2 part of surfactant was added and mixed for an additional 10 minutes. The lenses were prepared, coated with a 2.0 micron coating, and cured in the manner described in Example 1. See Table III for performance testing results.

| COMPOSITION | PARTS |
| --- | --- |
| Diethylene Glycol Diacrylate | 40.0 |
| Methyl Ethyl Ketone | 14.4 |
| 1-Pentanol | 20.7 |
| Ethanol | 14.4 |
| Irgacure-500 | 1.6 |
| Isopropylthioxanthone | 0.4 |
| Surfactant | 0.2 |

TABLE III

| Example | Substrate | Steel Wool | Lens Center Thickness | Impact Mean Break Point |
| --- | --- | --- | --- | --- |
| Example 3 | HIPU | good | 0.87 mm | 22.86 in/lb |
| Example 4 | HIPU | good | 1.03 mm | 31.25 in/lb |
| Example 5 | HIPU | excellent | 1.01 mm | 25.47 in/lb |

Note: Adhesion was excellent for all examples

EXAMPLE 6

It was discovered that impact resistance varies with the UV curable back coating thickness. For a coating that is more brittle than the substrate, better impact resistance was achieved by a thinner coating on the concave back of the lens. A more brittle coating would contain trifunctional and/or higher functionality acrylate. The following example illustrates this discovery. Dipentaerythritol pentaacrylate, aliphatic urethane triacrylate, tetraethylene glycol diacrylate and 1,6 hexandiol dimethacrylate were added to a solvent mixture that consisted of methyl ethyl ketone and amyl alcohol. The mixture was mixed for approximately 10 minutes. Finally, Irgacure-500 and surfactant was added and mixed for an additional 10 minutes. The lenses were prepared, coated and cured the same way as in Example 1. The exact component weights were the following:

| COMPOSITION | Parts (40% solid) | Parts (30% solid) |
| --- | --- | --- |
| Dipentaerythritol Pentaacrylate | 59.4 parts | 44.4 parts |
| Aliphatic urethane triacrylate | 59.4 parts | 44.4 parts |
| Tetraethylene glycol diacrylate | 59.4 parts | 44.4 parts |
| 1,6 Hexandiol dimethacrylate | 21.8 parts | 16.4 parts |
| Methyl ethyl ketone | 214.9 parts | 254.6 parts |
| Amyl Alcohol | 71.6 parts | 84.7 parts |
| Irgacure-500 | 12.0 parts | 9.0 parts |
| Surfactant | 1.5 parts | 1.5 parts |

The 20% composition was made by diluting the above 40% composition with 75 parts of methyl ethyl ketone and 25 parts of amyl alcohol and 0.4 part of surfactant. The lenses were prepared, cured and coated with these coatings in the same way as in Example 1. See Table IV for performance testing results on HIPU lenses.

TABLE IV

| HIPU SUBSTRATE | 20% SOLID | 30% SOLID | 40% SOLID |
| --- | --- | --- | --- |
| Avg. Center Thickness | 1.36 mm | 1.20 mm | 1.34 mm |
| Impact Mean Break Point | 61.01 in-lb | 47.68 in-lb | 3.59 in-lb |
| Coating Thickness | 1 micron | 2 microns | 4 microns |
| Steel Wool | poor | good | excellent |
| Adhesion | excellent | excellent | excellent |

These results reveal that impact resistance is excellent when the coating thickness is one or two microns, but is not as good at four microns. The results also reveal that compositions having as little as about 40% of difunctional acrylate, by weight of the multifunctional acrylate, can produce lenses having improved impact resistance.

EXAMPLE 7

When the coating is less brittle than the substrate, then a thicker layer of coating increases the impact resistance. Less brittle or more flexible coatings contain monofunctional and/or difunctional acrylates.

The following example illustrates this discovery. Diethylene glycol diacrylate is added to a solvent mixture that consisted of methyl ethyl ketone, 1-pentanol and ethanol. The mixture was mixed for approximately 10 minutes. Finally, Irgacure-500 and surfactant was added and mixed for an additional 10 minutes. The lenses were prepared, coated and cured the same way as in Example 1. The exact component weights were the following:

| COMPOSITION | PARTS (18% solid) | PARTS (45% solid) | PARTS (55% solid) |
| --- | --- | --- | --- |
| Diethylene Glycol Diacrylate | 18.0 | 45.0 | 54.7 |
| 1-Pentanol | 40.4 | 26.1 | 20.9 |
| Ethanol | 20.2 | 13.0 | 10.5 |
| Methyl Ethyl Ketone | 20.2 | 13.0 | 10.5 |
| Irgacure-500 | 1.1 | 2.7 | 3.3 |
| Surfactant | 0.2 | 0.2 | 0.2 |

TABLE V

| HIPU Substrate | 18% SOLID | 45% SOLID | 55% SOLID |
| --- | --- | --- | --- |
| Avg. Center Thickness | 1.10 mm | 1.13 mm | 1.13 mm |
| Impact Mean Break Point | 34.59 in-lb | 38.56 in-lb | 43.24 in-lb |
| Coating Thickness | 0.5 microns | 2.5 microns | 4.0 microns |
| Steel Wool | good | excellent | excellent |
| Adhesion | excellent | excellent | excellent |

TABLE VI

| CR39 Substrate | 18% SOLID | 45% SOLID | 55% SOLID |
| --- | --- | --- | --- |
| Avg. Center Thickness | 0.92 mm | 0.94 mm | 0.95 mm |
| Impact Mean Break Point | 2.05 in-lb | 9.68 in-lb | 10.45 in-lb |
| Coating Thickness | 0.5 microns | 2.5 microns | 4.0 microns |
| Steel Wool | excellent | excellent | excellent |
| Adhesion | excellent | excellent | excellent |

The above results reveal that impact resistance increases with both HIPU and CR39 substrates with thicker coating thicknesses.

COMPARATIVE EXAMPLES 8 AND 9

The concave side of the semifinished lenses (CR-39 and HIPU) were surfaced, a method of cutting and removing the substrate to a preferred thickness, and polished to 1.0 mm nominal center thickness. These lenses had a factory hard coat on the front side. A scrubbing compound named CR-Scrub (a widely used metal oxide slurry compound, a product of Lens Technology Inc. of Cerritos, Calif.) was used to prepare the concave back surface of the lens. The scrubbing procedure was necessary to provide a good coating adhesion to the lens. The scrubbing compound was washed off by using a mild liquid detergent. The lenses were wiped to dryness by using Kay Dry paper towels. A small amount of isopropanol was used to prepare the surface prior to loading the lenses into a spin coating machine. A very popular commercial U.V. curable abrasion resistant hard coating, Coburn/LTI HT-325-B from Coburn Optical Industries of Muskogee, Okla., was used to coat the back of these lenses. The coated lenses were transferred and cured in a UV curing machine. Finally, an antireflective coating was applied by vacuum deposition to both surfaces of the lens. A Dynatup impact tester was utilized for impact resistance testing.

TABLE VII

| Example | Back Coating (325B) | Substrate | Steel Wool | Lens Center Thickness | Anti-reflective Coat | Impact Mean Break Point after antireflective coating |
| --- | --- | --- | --- | --- | --- | --- |
| 8 | yes | CR-39 | excellent | 0.95 mm | yes | 1.93 in/lbs |
| 9 | yes | HIPU | excellent | 1.04 mm | yes | 1.60 in/lbs |

The impact resistance for the comparative examples was far less than all of the examples in Table I, II or III. Adhesion was excellent, but only after a thorough scrubbing with CR-Scrub. Adhesion was poor without scrubbing. This difference is significant because, in practice, failure to adequately perform the scrubbing step will result in an inferior lens. The preferred coatings of this invention do not require scrubbing for good adhesion.

In addition to the compositions of the Examples, other compositions can be used. Representative of the acrylates and acrylate oligomers which may be utilized to form the impact resistance imparting coatings of the present invention are:

ethylene glycol dimethacrylate
diethylene glycol diacrylate
diethylene glycol dimethacrylate
triethylene glycol diacrylate
triethylene glycol dimethacrylate
tetraethylene glycol diacrylate
tetraethylene glycol dimethacrylate
trimethylol propane triacrylate
trimethylol propane trimethocrylate
1,6 hexandiol diacrylate
pentaerythritol triacrylate
ethoxylated trimethylolpropane triacrylate
propoxylated trimethylolpropane triacrylate
pentaerythritol tetracrylate
dipentaerythritol pentaacrylate
aliphatic urethane diacrylate
aliphatic urethane triacrylate
tetraethylene glycol diacrylate 1,6 hexandiol dimethacrylate
aliphatic urethane triacrylate
epoxy diacrylate oligomer
aromatic urethane acrylate oligomer
polyester tetraacrylate oligomer The preferred compositions will contain about 20 percent to about 80 percent by weight of the acrylate(s). However, the exact amount is not critical provided it is dissolved in the solvent mixture. Also, it is possible that an acrylate can be used as a reactive diluent in place of, or in addition to, a solvent. The solvent is removed by evaporation or other suitable processes. Reactive diluent, if used, is consumed by the reaction and any excess is removed by suitable processes.

Although the compositions of the present invention may contain only one type of said multifunctional acrylate monomers, they may contain a mixture of one or more types of multifunctional monomers, preferably a diacrylate and/or a triacrylate. Multifunctional acrylate oligomers are also suitable for use in the invention. Preferably at least about 40% of the multifunctional acrylate, by weight of the multifunctional acrylate, is a diacrylate. More than about 10% of triacrylates, by weight of the multifunctional acrylate, in the composition will sometimes cause the coating to become too hard. In addition, minor amounts of mono-acrylate can be used in particular instances, for example, to improve adhesion.

The glass transition temperature of the multifunctional acrylate should be below about 60° C. This will prevent the coating from becoming too hard and losing the impact resistance imparting properties. Trifunctional acrylate oligomers having a glass transition temperature less than about 60° C. can also be used. More than 10%, by weight of the multifunctional acrylate, of such triacrylates could be used in the coatings of the invention. It is further possible that such triacrylates could form a major part of the multifunctional acrylates.

The compositions may also contain from 0 to 10% by weight of a colloidal dispersion of a water insoluble dispersant of metals, non-metals, alloys, or salts thereof, such as colloidal silica or antimony oxide. The silica should be in the form of a silicon dioxide ($SiO_2$) dispersed in a solvent. For example, MAST available from Nissan Chemical Industries is a dispersion of 30% $SiO_2$ and 70% methanol, by weight. Colloidal silica is available in basic or acidic form. Either may be utilized.

The solvent mixture for the acrylate(s) is preferably a mixture of a methyl lower alkyl (C1 to C4) ketone, such as methyl isobutyl ketone or methyl ethyl ketone, and a lower alkyl alcohol (C1–C6) such as methanol, ethanol, 1-butanol or amyl alcohol. The amount of the solvent mixture is not critical provided it is sufficient to dissolve the acrylate(s) and it can be readily removed to leave a coat of the acrylate(s) on the lens.

The preferred coating compositions also contain a photosensitizing amount of photoinitiator, such as Irgacure-500, i.e., an amount effective to effect the photocure of the coating composition. The amount will vary with the photoinitiator used. Generally, this amount is from about 0.01% to about 10% by weight, and preferably from about 0.1% to about 5% by weight of the photocurable coating composition.

The preferred compositions also contain an effective amount of a surfactant. Silicon and fluoro surfactants are preferred at amounts of about 0.01% to 0.50% by weight of the total composition.

The coating compositions of the present invention can be applied to the concave back of the lens by conventional methods, such as spin coating, flowing, spraying or dipping, to form a continuous coating. Optimum coating thickness which are about 0.1 micron to about 10 microns thick are obtained by spin coating procedures.

Prior to the composition being coated upon the back of the lens there may optionally be included a priming step wherein a primer, such as a thermosetting acrylic emulsion, is first applied to the substrate. After the coating composition is applied to the substrate or the primed substrate, the coating may be cured thereon by an effective amount of UV-radiation, which may be obtained from, for example, a Hanovia 550 watt lamp or a PPG Processor, Model QC1202.

Although other forms of curing can be used, including heat, ultraviolet light is preferred because of its relatively low cost, ease of maintenance, and low potential hazard to industrial users. Rapid photo-induced polymerizations utilizing UV light rather than thermal energy for the curing of coatings offer several other significant advantages. First, faster curing coatings offer substantial economic benefits. Furthermore, heat sensitive materials can be safely coated and cured with UV light without the use of thermal energy, which could damage the substrate.

According to another aspect of the invention, only the back side of a lens is provided with an impact resistance imparting coating. The impact resistance imparting coating can be one of the improved back coating compositions of the invention, or another impact coating such as a polyurethane or an epoxy coating. The lens is then coated with an abrasion resistant hard coating. Such a lens is shown in FIG. 3. A lens formed in this manner utilizes the back coatings of the invention, or another impact coating, to impart impact resistance to the lenses, yet has the abrasion resistance and tinting characteristics of the hard coatings. Much of the abrasion that a lens will encounter will be on the front side of the lens, and the presence of the impact resistance imparting coat on the front side can significantly decrease the abrasion performance of the lens. It has been found that the application of the impact resistance imparting coating only to the back side of the lens will provide a lens that has acceptable impact resistance. A lens according to this embodiment of the invention has good scratch resistance properties and impact resistance properties. A lens according to this embodiment of the invention also has good tinting characteristics.

It has further been found that the combination of applying an impact resistant coating to the back of a lens by a spin coating process, and applying an abrasion resistant hard coating by a dip coating process, produces a lens with desirable properties. The lens is impact resistant, abrasion resistant, and light in weight. As shown in FIG. 3, the lens 10 has an impact coating that has been applied to the concave back side 19 of the lens 10 by a spin coating process. An abrasion resistant hard coat 21 is applied by a dip coating process over the front and back surfaces of the lens 10.

EXAMPLE 10

Tetraethyleneglycol diacrylate 89.4 parts were added to a premixed solvent that consisted of 153.9 parts of methyl isobutyl ketone and 51 parts of 1-butanol. The mixture was stirred and mixed for 10 minutes.

3.5 parts of photoinitiator Irgacure 500 and 0.05 part of surfactant was added to the mixture. The final coating formulation was allowed to mix for an additional 10 minutes. The coating was filtered prior to coating application.

Semi-finished uncoated single vision CR-39 −2.00 lenses surfaced to 1.0 mm center thickness (used for impact testing) and uncoated finished single vision plano CR-39 lenses (used for physical performance characterization) were subjected to a cleaning process using 10% aqueous sodium hydroxide solution for 3 minutes @ 60° C., which was followed by water washing and drying. Lenses were then spin coated on the backside (concave) surface and cured in the Quick Cure III UV cure unit for 22 seconds. These lenses with backside impact coating of 1.7 microns thickness were further dip coated with an epoxy silane colloidal silica tintable hardcoat, and post cured for 3 hours at 110° C. The final lenses were subjected to physical performance characterization (see Tables VIII and IX).

For impact testing, a vacuum antireflective coating as previously described was applied to both surfaces of the lens and impact mean break point determined by the Dynatup procedure previously described. Antireflective coatings, in general, dramatically lower the impact of lenses and represent the worst case for impact.

EXAMPLE 11

In this example, the same coating as in Example 10 was applied to HIPU lenses in the same manner as Example 10, except that a higher index epoxy silane colloidal silica tintable hardcoat was used. Coated lenses were postcured for 2 hours at 100° C. with a 3 hour cool down. The final lenses were subjected to physical performance characterization as in previous examples (see Tables VIII and IX).

TABLE VIII

| Substrate | Backside Coating | Bayer Abrasion | Steel Wool | Adhesion |
| --- | --- | --- | --- | --- |
| CR39 | yes | 1.90 | Excellent | Excellent |
| CR39 | no | 2.20 | Excellent | Excellent |
| HIPU | yes | 1.79 | Excellent | Excellent |
| HIPU | no | 1.70 | Excellent | Excellent |

TABLE IX

| Substrate | Back Coating | Impact Mean Break Point |
| --- | --- | --- |
| CR-39 | yes | 5.78 in/lb |
| CR-39 | no | 1.92 in/lb |
| HIPU | yes | 25.23 in/lb |
| HIPU | no | 2.15 in/lb |

EXAMPLE 12

Tetraethylene glycol diacrylate 30.3 parts were added to a premixed solvent with 45.5 parts of methyl ethyl ketone and 15.2 parts of 1-butanol. The mixture was stirred for 10 minutes. About 1.2 parts of Irgacure 500 and 7.6 parts of colloidal silica in methanol (MAST from Nissan Chemical Industries) were added to the mixture. Finally 0.15 part of surfactant was added and stirred for an additional 10 minutes.

This backside impact coating was filtered, applied, and cured as in Example 10. The backside coated lens thus obtained was dip coated with an epoxy silane colloidal silica tintable hardcoat, cured and tested as in Example 10. See Tables X and XI.

EXAMPLE 13

In this example the same coating as in Example 11 was applied to HIPU lenses in the same manner as in Example 11, except that a higher index epoxy silane colloidal silica tintable hardcoat was used. Also, coated lenses were post-cured for 2 hours @ 100° C. with a 3 hour cool down.

The final lenses were subjected to physical performance characterization as in previous examples. See Tables X and XI.

TABLE X

| Substrate | Backside Coating | Bayer Abrasion | Steel Wool | Adhesion |
| --- | --- | --- | --- | --- |
| CR39 | yes | 2.19 | Excellent | Excellent |
| CR39 | no | 2.07 | Excellent | Excellent |
| HIPU | yes | 2.10 | Excellent | Excellent |
| HIPU | no | 2.04 | Excellent | Excellent |

TABLE XI

| Substrate | Back Coating | Impact Mean Break Point |
| --- | --- | --- |
| CR-39 | yes | 11.27 in/lb |
| CR-39 | no | 1.27 in/lb |
| HIPU | yes | 49.35 in/lb |
| HIPU | no | 2.15 in/lb |

These examples demonstrate that lenses which have been backside coated with coatings of this invention and then dipcoated provide drastically improved impact resistance when compared to the same hardcoated lenses without backside coating. Furthermore, the physical performance characteristics can be as good as with the hard coat alone.

The invention is useful with lenses formed from a variety of different lens materials, and particularly from a number of different polymeric plastic resins. A common ophthalmic lens material is diethylene glycol bis (allyl carbonate). Lens materials with higher refractive indices are now growing in popularity. One such material is a high index polyurethane. Other high index lens materials are based on acrylic or allylic versions of bisphenols or allyl phthalates and the like. Other examples of lens materials that may be suitable for use with the invention include other acrylics, other allylics, styrenics, polycarbonates, vinylics, polyesters, and the like.

It will be appreciated by those skilled in the art that a number of modifications and changes can be made without departing from the spirit and scope of the invention. Therefore, it is intended that the invention be only limited by the claims.

We claim:

1. A plastic ophthalmic lens having a back surface and a front surface, wherein only the back surface is covered by an impact resistance imparting coat comprising a cured multifunctional acrylate at least about 40%, by weight of said multifunctional acrylate, being a difunctional acrylate.

2. The ophthalmic lens of claim 1, in which at least one multifunctional acrylate has a glass transition temperature below about 60° C.

3. The ophthalmic lens of claim 1, in which the multifunctional acrylate is tetraethylene glycol diacrylate.

4. The ophthalmic lens of claim 1, in which the multifunctional acrylate is diethylene glycol diacrylate.

5. The ophthalmic lens of claim 1, in which the multifunctional acrylate is diethylene glycol diacrylate.

6. The ophthalmic lens of claim 1, in which an antireflective coating is applied over at least the impact resistance imparting coat.

7. The ophthalmic lens of claim 1, in which the coat also contains a colloidal dispersion of a water insoluble dispersant of metals, non-metals, alloys or salts thereof.

8. The ophthalmic lens of claim 1, in which the lens is made of diethylene glycol bis(allylcarbonate).

9. The ophthalmic lens of claim 1, in which the lens is made of high index polyurethane.

10. The ophthalmic lens of claim 1, in which the lens is made of acrylic.

11. The ophthalmic lens of claim 1, in which the impact resistance imparting coat is about 0.5 micron to about 10 microns thick.

12. The ophthalmic lens of claim 1, further comprising an abrasion resistant hard coat.

13. The ophthalmic lens of claim 12, wherein said hard coat comprises the silanol condensation product of a colloidal silica sol and/or metal and non-metal oxide sols and an organosilane containing functional groups.

* * * * *